United States Patent [19]
Meissner

[11] Patent Number: 5,616,056
[45] Date of Patent: Apr. 1, 1997

[54] AUXILIARY PROPULSION SYSTEM FOR SEAGOING SHIPS

[75] Inventor: Hans-Michael Meissner, Bad Schwartau, Germany

[73] Assignee: Blohm + Voss GmbH, Hamburg, Germany

[21] Appl. No.: 529,483

[22] Filed: Sep. 12, 1995

[30] Foreign Application Priority Data

Sep. 13, 1994 [DE] Germany .......................... 44 32 483.9

[51] Int. Cl.$^6$ .................................................. B63H 21/20
[52] U.S. Cl. .............................................................. 440/3
[58] Field of Search ................... 440/3, 4, 75; 74/665 A, 74/665 R, 745; 192/41 R

[56] References Cited

U.S. PATENT DOCUMENTS

| | | | |
|---|---|---|---|
| 4,309,914 | 1/1982 | Hiersig et al. | 440/3 |
| 4,417,878 | 11/1983 | Koren | 440/3 |

Primary Examiner—Jesus D. Sotelo
Attorney, Agent, or Firm—Nils H. Ljungman and Associates

[57] ABSTRACT

An auxiliary propulsion system that can be combined with a diesel engine to drive the shaft. A retrofittable diesel engine with a generator is installed to operate an electric motor. The electric motor is coupled to the shaft by means of a transmission with a flexible coupling and a clutch.

20 Claims, 4 Drawing Sheets

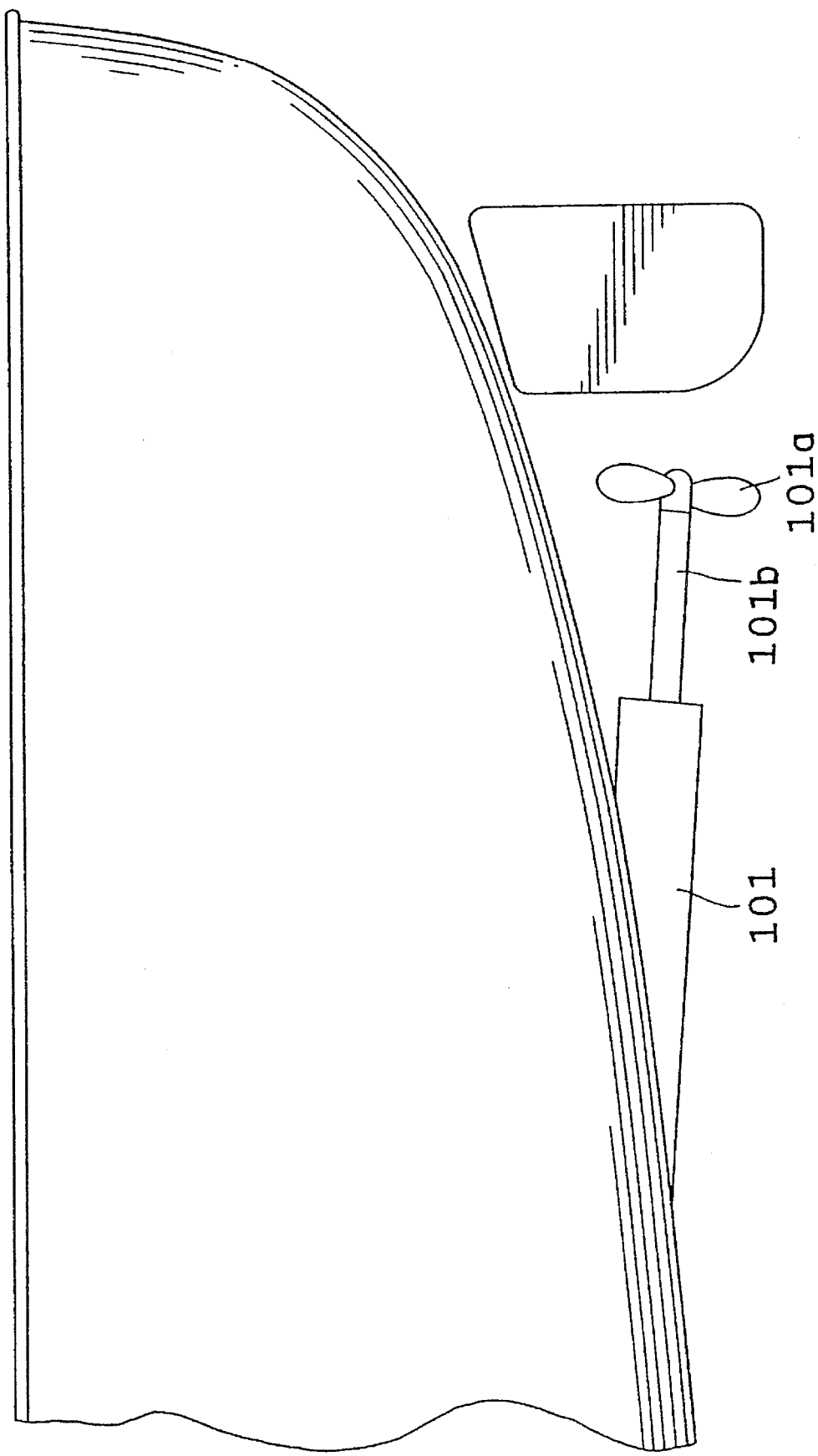

AUXILIARY PROPULSION SYSTEM FOR SEAGOING SHIPS

BACKGROUND OF THE INVENTION

1. Field of the Invention

The present invention generally relates to an auxiliary propulsion system for seagoing ships, whereby a diesel engine is the principal propulsion engine which drives a propeller by means of a shaft system.

2. Background Information

Generally, when ships are converted, refitted or modified, an attempt is often made to increase the attainable speed using the existing propulsion system. It has been determined that this objective cannot always be achieved by modifying the hydrodynamic characteristics of the fore-body and aft-body, or by shortening the ship to save power. On container ships, such modifications can significantly reduce capacity. Since the existing main engine cannot usually be replaced with a larger engine, on account of the limited space available and the related costs, the limit of what is feasible is generally determined on the basis of what design and modification measures are considered economically justifiable.

OBJECT OF THE INVENTION

An object of the present invention is to create an auxiliary propulsion system to increase power, one which can be retrofitted on existing propulsion systems and which can be installed after the ship has been built.

SUMMARY OF THE INVENTION

The invention teaches that the above object can be achieved, in accordance with at least one preferred embodiment, by means of a retrofittable diesel engine with a generator which drives an electric motor, and by an electric motor which can be coupled to the shaft system by means of a transmission with a flexible coupling and a hydraulic clutch, to increase the power which can be generated by the main engines.

It thereby becomes possible to carry out the desired retrofitting, and, if necessary, to locate the diesel engine required for the generation of electrical energy by means of the generator in a new engine room which is located at some distance from the existing main engine.

For the effective coupling of a non-uniform torque generated by the existing diesel engine and the uniform torque generated by the new electric motor, the present invention teaches that the diesel engine, which is the main engine, can be coupled to the electric motor and the energy generation system and be adjusted by means of a control unit.

In one favorable embodiment, the electric motor with the transmission and the clutch on the flywheel of the diesel engine, which is the main engine, can be connected to the shaft by means of a flexible coupling.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One embodiment of the invention is illustrated schematically in the accompanying drawings, wherein:

FIG. 1a is an external view of a portion of a deep-draft or seagoing vessel;

DESCRIPTION OF THE PREFERRED EMBODIMENT

FIG. 1a generally shows the bottom rear portion of a hull of a typical deep-draft or seagoing vessel with a single propeller 101a. Extending rearwardly from the hull is a stern tube 101. A propeller shaft 101b passes from the interior of the ship and to the exterior thereof through the stern tube 101. The propeller 101a can be affixed to the end of the shaft 101b.

Figure 1:
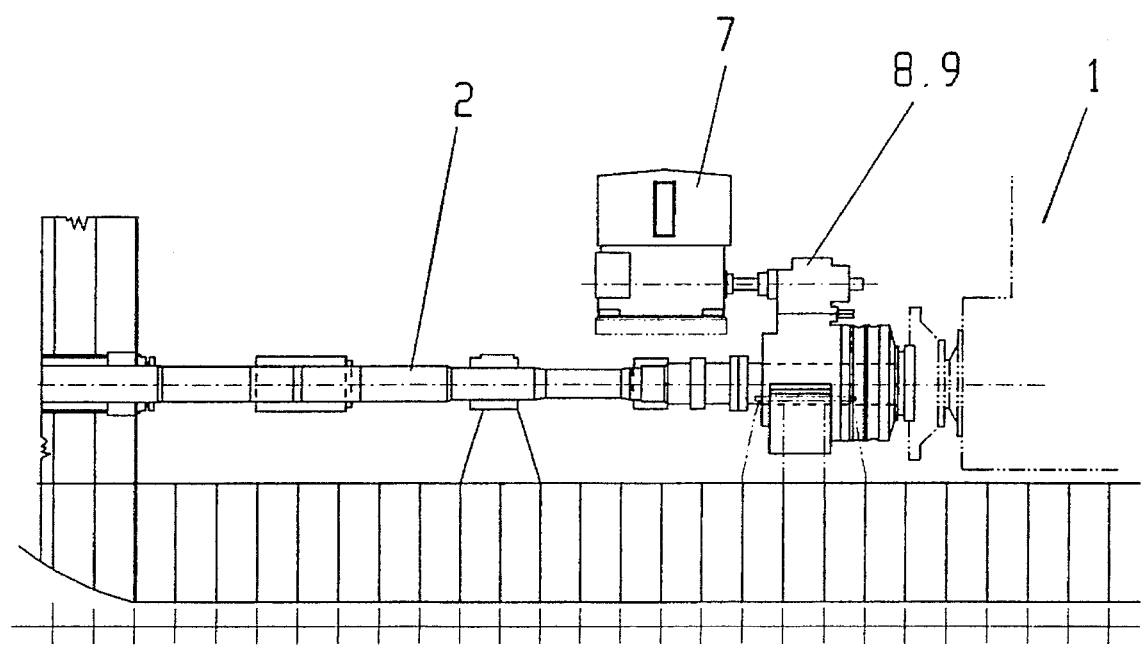
FIG. 1 shows a shaft system with the corresponding propulsion units.
Figure 2:
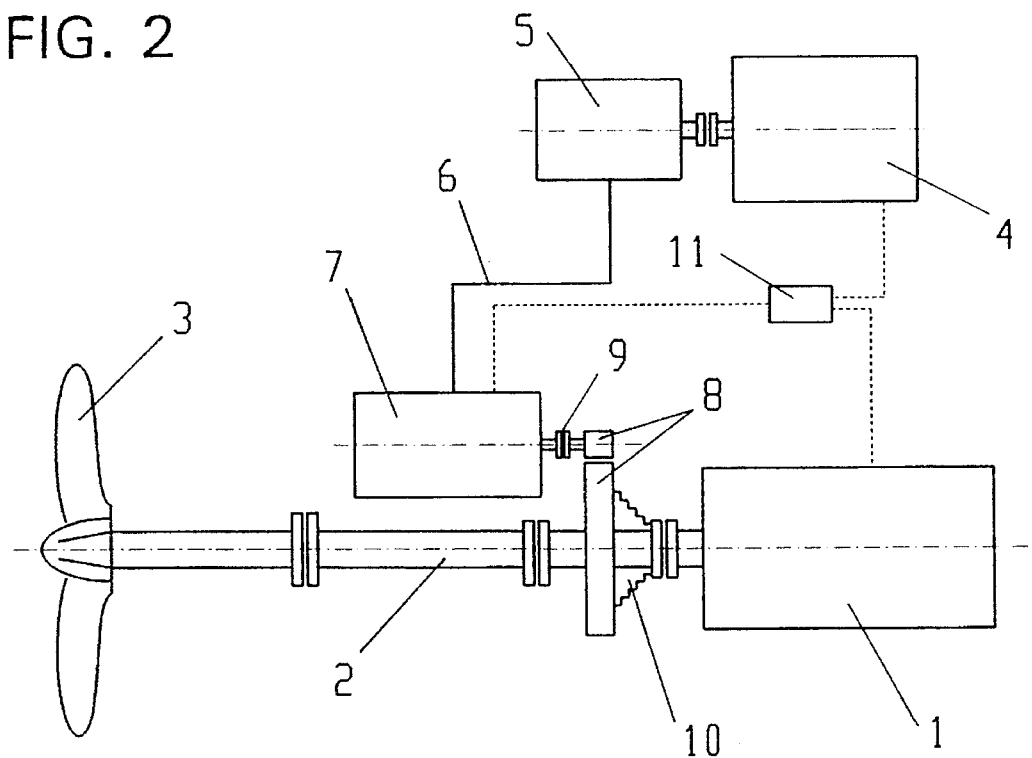
FIG. 2 is a schematic block diagram of the overall system.
Figure 3:
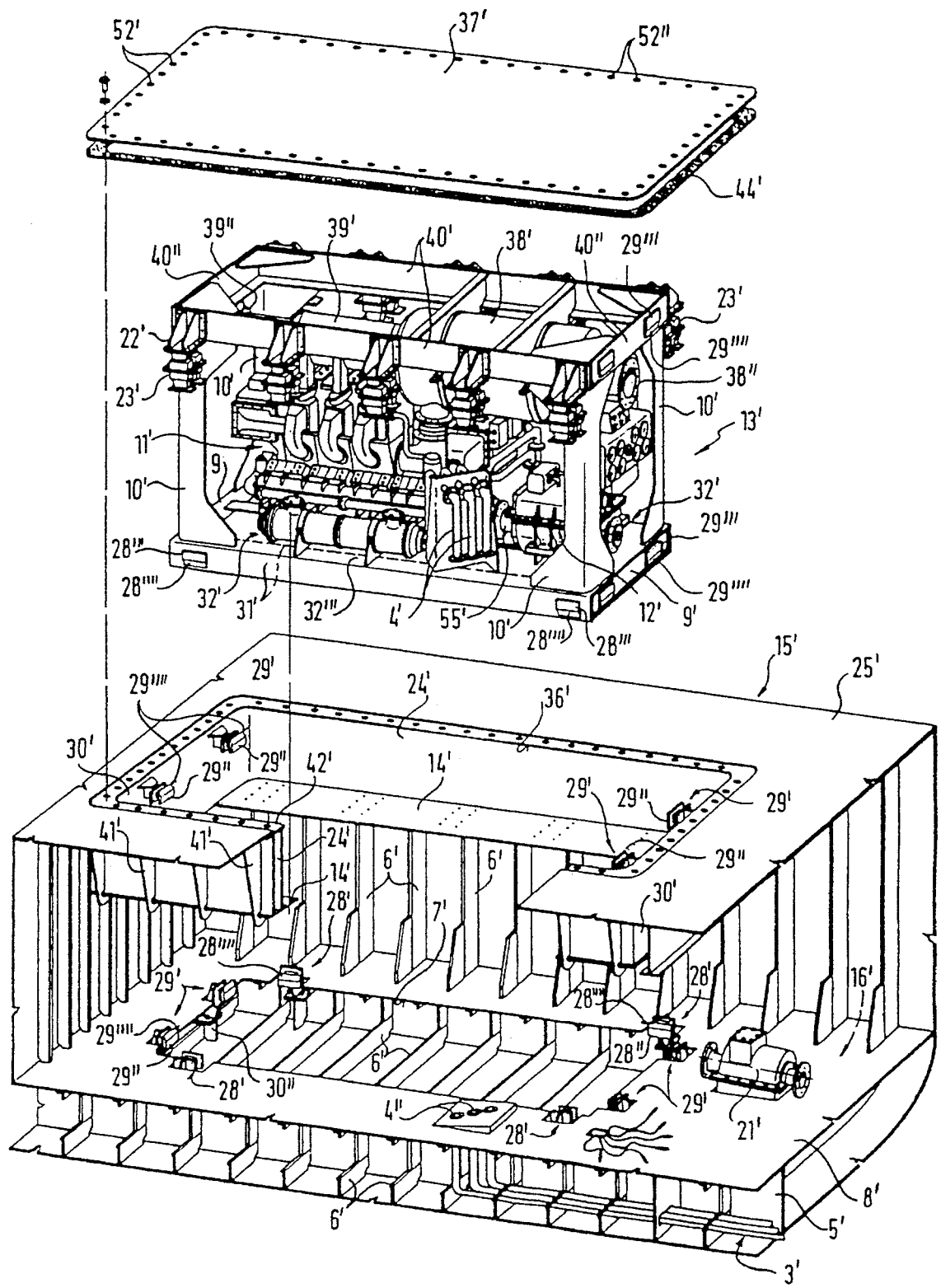
FIG. 3 is an illustration of a diesel engine that may be utilized in accordance with the embodiments of the present invention.

Turning now to the remaining figures, it should be understood that components discussed herebelow with reference to FIGS. 1–3 may, if appropriate, be considered to be interchangeable with similar components discussed hereabove with respect to FIG. 1a.

In the illustrated system, as shown in both FIGS. 1 and 2, a diesel engine 1, which is the main engine, is coupled to a shaft system 2 to drive a propeller 3. As an auxiliary propulsion system, there is preferably an additional diesel engine 4 with a coupled generator 5, which is connected to an electric motor 7 by means of a connecting line 6. The electric motor 7 acts by means of a transmission 8, a clutch 9 and a flexible coupling 10 on the shaft system 2 simultaneously with the diesel engine 1, which is the main propulsion engine. To take into consideration the different torque characteristics of the diesel engine 1 and the electric motor 7 and the diesel engine 4, the two propulsion units and the energy generation system 4 and 5 are preferably coupled by means of a control unit 11, which control unit preferably has access to corresponding programs by means of a corresponding computer. It is thereby possible to locate a retrofittable propulsion unit with its essential parts, i.e. the diesel engine 4 and generator 5, at some distance from the diesel engine 1 which is the main engine, and to apply auxiliary power to the shaft system 2 by means of an electric motor 7.

In accordance with a preferred embodiment of the present invention, flexible coupling 10 will preferably be so configured as to reduce, or even eliminate, any potential adverse effects that oscillations of shaft 2 may have on that part of transmission 8 associated with electric motor 7 and clutch 9. This would appear to be particularly important if transmission 8 is embodied by a gear transmission.

It will be appreciated that, in accordance with at least one preferred embodiment of the present invention, the manner of driving electric motor 7 can be considered to be substantially similar to that associated with the operation of a "hybrid drive", such as the use of a non-electrically powered engine to drive a generator, which generator in turn drives an electric motor.

It will also be appreciated that, in accordance with at least one preferred embodiment of the present invention, the diesel engine 4 can be made to be notably smaller than diesel engine 1, depending on the desired range of output of electric motor 7.

Preferably, the aforementioned control unit 11 will contain sufficient programming and/or memory so as to adequately control the driving of electric motor 7 with relation to the driving of diesel engine 1, or vice versa. Conceivably, control unit 11 could include a feedback arrangement, so as to essentially monitor one or more operating characteristics of diesel engine 1, such as the speed of the engine 1 or shaft 2 or both, and utilize such monitored characteristics as parameters for operating electric motor 7. This would appear to be particularly beneficial if, for example, the actual operating speed of diesel engine 1 does not match, whether due to manufacturing tolerances or other phenomena, the desired, predetermined speed of diesel engine 1. Of course, operation of electric motor 7 itself can preferably be regulated either through direct control of the output of electric motor 7 or through control of diesel engine 4. Conceivably, a feedback arrangement could also be utilized in conjunction with electric motor 7, in that one or more operating characteristics of electric motor 7 could be monitored in relation to the initial power input provided by diesel engine 4 and generator 5.

Figure 2A:
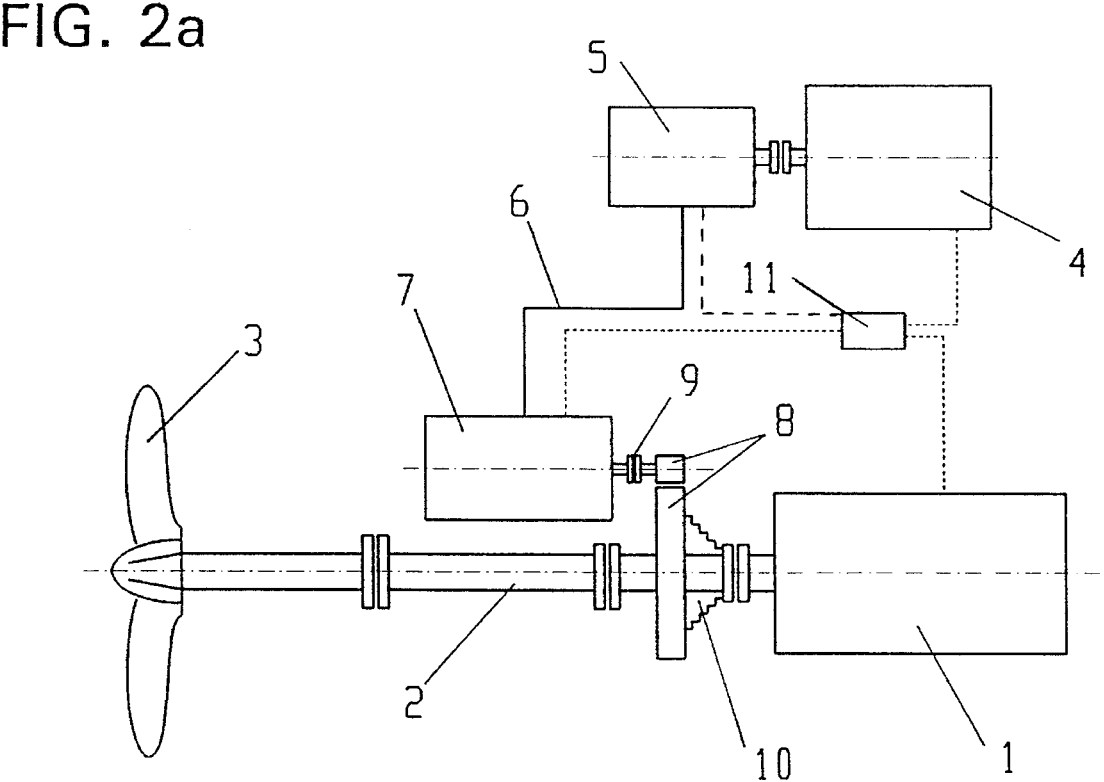
FIG. 2a is essentially the same as FIG. 2, but more detailed.

FIG. 2a illustrates an additional control line, extending from control unit 11 to generator 5. In this manner, the output of the generator 5 can be regulated outright, or can be fine-tuned with respect to the level of electrical power generated as a result of the driving of the diesel engine 4.

A typical diesel engine, and enclosure, for possible use in conjunction with at least one preferred embodiment of the present invention, is illustrated in FIG. 3. Such an engine, with surrounding enclosure, is described in detail with relation to FIG. 6 of U.S. Pat. No. 4,678,439, which issued to Schlichthorst on Jul. 7, 1987. This U.S. Patent is hereby incorporated by reference herein. The reference numerals set forth in the aforementioned U.S. Patent, with relation to FIG. 6 thereof, are each correspondingly represented in FIG. 3 of the instant application by the same reference numerals, but with the addition of a "prime" symbol.

One feature of the invention resides broadly in the auxiliary propulsion system for seagoing ships, whereby a diesel engine, which is the main engine, drives a propeller by means of a shaft system, characterized by the fact that a retrofittable diesel engine 4 with a generator 5 which operates an electric motor 7 can be coupled by means of a transmission 8 with a flexible coupling 10 and a clutch 9 to the shaft system 2 to increase the power of the main engine.

Another feature of the invention resides broadly in the auxiliary propulsion system characterized by the fact that the diesel engine 1, which is the main engine, and the electric motor 7 and the energy generation system 4 and 5, can be coupled to one another and adjusted by means of a control unit 11.

Yet another feature of the invention resides broadly in the auxiliary propulsion system characterized by the fact that the electric motor 7 with a transmission 8 can be coupled to the shaft system 2 by means of a flexible coupling 10 and clutch 9 on the flywheel of the diesel engine 1, which is the main engine.

Examples of components relating to engines of ships, which may be utilized in accordance with the embodiments of the present invention, may be found in the following U.S. Patents: U.S. Pat. No. 4,678,439, which issued to Schlichthorst on Jul. 7, 1987, U.S. Pat. No. 4,586,908, which issued to Schlichthorst on May 6, 1986; U.S. Pat. No. 4,691,560, which issued to Otto on Sep. 8, 1987.

Further examples of ship transmissions and engine installations, having components which may be utilized in accordance with the embodiments of the present invention, may be found in the following U.S. Patents: U.S. Pat. Nos. 4,309,914; 4,229,990; 4,188,833; 3,962,933; 3,930,379; 3,858,411; 4,412,500; 4,406,633; 4,368,048; 4,290,270; and 4,274,827.

Examples of flexible coupling arrangments, which may be utilized in accordance with the embodiments of the present invention, may be found in the following U.S. Patents: U.S. Pat. No. 5,048,847, which issued to Kovacs et al. on Sep. 17, 1991; U.S. Pat. No. 4,207,758, which issued to Stone on Jun. 17, 1980; U.S. Pat. No. 4,229,951, which issued to Jedlicka on Oct. 28, 1980; U.S. Pat. No. 4,274,269, which issued to Trabue on Jun. 23, 1981; U.S. Pat. No. 5,233,886, which issued to Bossler, Jr. on Aug. 10, 1993; U.S. Pat. No. 5,325,939, which issued to Valenza on Jul. 5, 1994.

Examples of general control systems for ship drives, which may be utilized in accordance with the embodiments of the present invention, may be found in the following U.S. Patents: U.S. Pat. No. 5,171,170, which issued to Ridder et al. on Dec. 15, 1992; U.S. Pat. No. 5,222,901, which issued to Burkenpas on Jun. 29, 1993; and U.S. Pat. No. 5,336,120, which issued to Maurer et al. on Aug. 9, 1994.

Additional examples of components relating to ship engines, which may be utilized in accordance with the embodiments of the present invention, may be found in the following U.S. Patents: U.S. Pat. Nos. 5,171,170, which issued to Ridder et al. on Dec. 15, 1992; U.S. Pat. No. 5,030,149, which issued to Fujita on Jul. 9, 1991.

Several U.S. patents disclose hybrid drive arrangements and components associated therewith, and discuss general principles relating to hybrid drives. Still other U.S. patents disclose other components that may be relevant in the context of hybrid drive arrangements. Such patents are as follows:

Some examples of hybrid engines and control systems therefor which may be utilized in accordance with the present invention are disclosed in the following U.S. Patents: U.S. Pat. No. 4,305,254 to Kawakatsu et al. on Dec. 15, 1981, entitled "Control Apparatus and Method for Engine/Electric Hybrid Vehicle"; and U.S. Pat. No. 4,335,429 to Kawakatsu on Jun. 15, 1982, entitled "Control Apparatus for Engine/Electric Hybrid Vehicle".

Some examples of electric motors which can be operated as generators which may be utilized in accordance with the present invention are disclosed in the following U.S. Patents: U.S. Pat. No. 5,327,992 to Boll on Jul. 12, 1994, entitled "Method for Controlling a Hybrid Drive Which Drives a Vehicle"; U.S. Pat. No. 5,249,637 to Heidl et al. on Oct. 5, 1993, entitled "Hybrid Vehicle"; and U.S. Pat. No. 5,323,743 to Kristiansson on Jun. 28, 1994, entitled "Surestart Device for Internal Combustion Engine".

Some examples of generators which can be operated as motors which may be utilized in accordance with the present invention are disclosed in the following U.S. Patents: U.S.

Pat. No. 5,272,379 to Sugiyama et al. on Dec. 21, 1993, entitled "Power Supply Device for an Electric Vehicle"; U.S. Pat. No. 5,283,471 to Raad on Feb. 1, 1994, entitled "DC Generator and Back-up Engine Starting Apparatus"; and U.S. Pat. No. 5,281,905 to Dhyanchand et al. on Jan. 25, 1994, entitled "Induction Machine Based Hybrid Aircraft Engine Starting/Generating Power System".

Some examples of converters which may utilized in accordance with the present invention are disclosed in the following U.S. Patents: U.S. Pat. No. 4,651,078 to Todoroki et al. on Mar. 17, 1987, entitled "Device for Driving an Induction Motor"; U.S. Pat. No. 4,673,858 to Saito on Jun. 16, 1987, entitled "Power Converter for AC Load"; U.S. Pat. No. 4,757,435 to Wood et al. on Jul. 12, 1988, entitled "Static-controlled Current-source AC/DC Power Converter and DC/AC Power Converter, and Protection System Embodying the Same"; U.S. Pat. No. 4,636,927 to Rhyne et al. on Jan. 13, 1987, entitled "DC to AC Converter"; U.S. Pat. No. 4,181,932 to Fujiwara on Jan. 1, 1980, entitled "Power Converter"; U.S. Pat. No. 4,366,532 to Rosa et al. on Dec. 28, 1982, entitled "AC/DC or DC/AC Converter System With Improved AC-line Harmonic Reduction"; U.S. Pat. No. 4,165,801 to Watanabe et al. on Aug. 28, 1979, entitled "Static Leonard System"; and U.S. Pat. No. 4,894,762 to Steinshorn on Jan. 16, 1990, entitled "Method and Apparatus to Avoid Commutation Failure in a Regenerative Converter".

Some examples of DC to AC converters which may be utilized in accordance with the present invention are disclosed in the following U.S. Patents: U.S. Pat. No. 4,173,040 to Borzov et al. on Oct. 30, 1979, entitled "DC to AC Voltage Converter"; U.S. Pat. No. 4,196,469 to Gurwicz on Apr. 1, 1980, entitled "DC-AC Converter Including Synchronized Switching"; U.S. Pat. No. 4,453,205 to Brakus on Jun. 5, 1984, entitled "DC/AC Converter With Shunt Regulated Load"; U.S. Pat. No. 4,443,750 to Altena on Apr. 17, 1984, entitled "Energy Saving Motor Speed Controller"; U.S. Pat. No. 4,446,052 to Thrap on Aug. 14, 1984, entitled "Programmable DC-To-AC Voltage Converter"; and U.S. Pat. No. 4,528,457 to Keefe et al. on Jul. 9, 1985, entitled "DC-AC Converter for Supplementing an AC Power Source".

Some examples of AC to DC converters which may be utilized in accordance with the present invention are disclosed in the following U.S. Patents: U.S. Pat. No. 4,639,848 to Sakai on Jan. 27, 1987, entitled "Method and System for Controlling an AC-DC Converter System"; U.S. Pat. No. 4,656,571 to Umezu on Apr. 7, 1987, entitled "Frequency Converting Device and Control Method Therefor"; U.S. Pat. No. 4,739,466 to Glennon et al. on Apr. 19, 1988, entitled "Regulated AC/DC Converter"; U.S. Pat. No. 4,85,837 to Gulczynski on Aug. 1, 1989, entitled "Synchronous Switching Power Supply With Flyback Converter"; and U.S. Pat. No. 4,719,552 to Albach et al. on Jan. 12, 1988, entitled "AC-DC Converter Triggered by Variable Frequency Pulses".

Some examples of variable frequency converters which may be utilized in accordance with the present invention are disclosed in the following U.S. Patents: U.S. Pat. No. 4,743,777 to Shilling et al. on May 10, 1988, entitled "Starter Generator System With Two Stator Exciter Windings"; and U.S. Pat. No. 5,093,751 to Yuki et al. on Mar. 3, 1992, entitled "Carry Noise Measuring System for Magnetic Recording Medium".

An example of a DC to DC converter which may be utilized in accordance with the present invention is disclosed in U.S. Pat. No. 4,513,361 to Rensink on Apr. 23, 1985, entitled "Multi-phase DC-to-AC and DC-to-DC Boost Converter".

Examples of voltage monitors and voltage regulators which may be utilized in accordance with the present invention may be disclosed in the following U.S. patents: U.S. Pat. No. 5,302,889 to Marsh on Apr. 12, 1994, entitled "Voltage Regulator"; U.S. Pat. No. 5,264,781 to Miller et al. on Nov. 23, 1993, entitled "Current Control/Power Limiter Circuit"; and U.S. Pat. No. 5,255,177 to Oku on Oct. 19, 1993, entitled "High-voltage Power Source Control Device".

Examples of hybrid drive arrangements, such as internal combustion engine-electric generator arrangements, and components associated therewith, such as control arrangements and individual motors for driving corresponding wheels, may be found in the following U.S. Patents: U.S. Pat. No. 5,327,987, which issued to Abdelmalek on Jul. 12, 1994; U.S. Pat. No. 5,318,142, which issued to Bates et al. on Jun. 7, 1994; U.S. Pat. No. 5,301,764, which issued to Gardner on Apr. 12, 1994; U.S. Pat. No. 5,249,637, which issued to Heidl et al. on Oct. 5, 1993; U.S. Pat. No. 5,176,213, which issued to Kawai et al. on Jan. 5, 1993; U.S. Pat. No. 5,327,992, which issued to Boll on Jul. 12, 1994; U.S. Pat. No. 5,291,960, which issued to Brandenburg et al. on Mar. 8, 1994; and U.S. Pat. No. 5,264,764, which issued to Kuang on Nov. 23, 1993.

Examples of electric and hybrid vehicles, and related components, may be or are disclosed in the following U.S. Patents: U.S. Pat. No. 5,251,721 entitled "Semi-hybrid Electric Automobile" to Ortenheim; U.S. Pat. No. 5,004,061 entitled "Electrically Powered Motor Vehicle" to Andruet; U.S. Pat. No. 5,289,100 entitled "System for Powering, Speed Control, Steering, and Braking" to Joseph; U.S. Pat. No. 5,265,486 entitled "Portable External Drive Assembly" to AAMCO Corporation; U.S. Pat. No. 5,289,890 entitled "Drive Unit for Electric Motor Vehicle" to Aisin; and U.S. Pat. No. 5,310,387 entitled "Differential Motor Drive" to Hughes Aircraft Company.

Additional examples of electric vehicles in which the present invention may be utilized may be or are disclosed in the following U.S. Patents: U.S. Pat. No. 5,166,584 entitled "Electric Vehicle" to Nissan; U.S. Pat. No. 5,161,634 entitled "Electric Vehicle" to Kubota Corporation; and U.S. Pat. No. 5,150,045 entitled "Electric Automobile" to Kaisha.

Examples of electronic commutation devices, which may be utilized in accordance with the embodiments of the present invention, may be found in the following U.S. Patents: U.S. Pat. No. 5,164,623 entitled "Independent-drive Wheel for a Wheel-mounted Vehicle"; U.S. Pat. No. 5,117,167 entitled "Commutating Energy Suppression Circuit for an Electronically Commutated DC Motor" to Rotron; U.S. Pat. No. 5,258,679 entitled "Structure of DC Motor with Electronic Commutation" to ECIA; and U.S. Pat. No. 5,117,167 entitled "Commutating Energy Suppression Circuit for an Electronically Commutated DC Motor" to Rotron.

Examples of Phase angle sensors, which may be utilized in accordance with the embodiments of the present invention, may be found in the following U.S. Patents: U.S. Pat. No. 5,203,290 entitled "Intake and/or Exhaust-valve Timing Control System for Internal Combustion Engine" to Atsugi Unisia; U.S. Pat. No. 5,277,063 entitled "Single Plane Trim Balancing" to General Electric; U.S. Pat. No. 5,353,636 entitled "Device for Determining Misfiring of Cylinders in Multi-cylinder Engines" to Toyota; U.S. Pat. No. 5,068,876 entitled "Phase Shift Angle Detector" to Sharp; U.S. Pat. No.

5,097,220 entitled "Circuit for Demodulating PSK Modulated Signal by Differential-Defection to Japan Radio; and U.S. Pat. No. 5,063,332 entitled "Feedback Control System for a High-efficiency Class-D Power Amplifier Circuit".

Examples of three-phase motors for use with electric or hybrid vehicles, which may be utilized in accordance with the embodiments of the present invention, may be found in the following U.S. Patents: U.S. Pat. No. 5,182,508, which issued to Schauder on Jan. 26, 1993; U.S. Pat. No. 5,194,800, which issued to Conzelmann et al. on Mar. 16, 1993; U.S. Pat. No. 5,216,212, which issued to Golowash et al. on Jun. 1, 1993; U.S. Pat. No. 5,230,402, which issued to Clark et al. on Jul. 27, 1993; and U.S. Pat. No. 5,294,853, which issued to Schluter et al. on Mar. 15, 1994.

Examples of sensors, such as speed and/or torque sensors, which may be utilized in accordance with the embodiments of the present invention, may be found in the following U.S. Patents: U.S. Pat. No. 5,294,871, which issued to Imaseki on Mar. 15, 1994; U.S. Pat. No. 5,345,154, which issued to King on Sep. 6, 1994; U.S. Pat. No. 5,359,269, which issued to Wedeen on Oct. 25, 1994; U.S. Pat. No. 5,182,711, which issued to Takahashi et al. on Jan. 26, 1993; U.S. Pat. No. 5,245,966, which issued to Zhang et al. on Sep. 21, 1993; and U.S. Pat. No. 5,332,059, which issued to Shirakawa et al. on Mar. 15, 1994.

Examples of other media having components which may be utilized in accordance with the embodiments of the present invention, may be found in the following U.S. Patents: U.S. Pat. No. 5,277,063, which issued to Thomas on Jan. 11, 1994; U.S. Pat. No. 5,373,630, which issued to Lucier et al. on Dec. 20, 1994; U.S. Pat. No. 5,373,632, which issued to Lucier et al. on Dec. 20, 1994.

Examples of battery-operated electric vehicles, having components, such as batteries for providing electrical power, which may be utilized in accordance with the embodiments of the present invention, may be found in the following U.S. Patents: U.S. Pat. No. 5,229,703, which issued to Harris on Jul. 20, 1993; U.S. Pat. No. 5,325,912, which issued to Hotta et al. on Jul. 5, 1994; U.S. Pat. No. 5,332,630, which issued to Hsu on Jul. 26, 1994; U.S. Pat. No. 5,369,540, which issued to Konrad et al. on Nov. 29, 1994; U.S. Pat. No. 5,373,910, which issued to Nixon on Dec. 20, 1994.

Examples of converter arrangements, having components which may be utilized in accordance with the embodiments of the present invention, may be found in the following U.S. Patents: U.S. Pat. No. 5,309,073, which issued to Kaneko et al. on May 3, 1994; U.S. Pat. No. 5,321,231, which issued to Schmalzriedt on Jun. 14, 1994; U.S. Pat. No. 5,341,083, which issued to Klontz et al. on Aug. 23, 1994; U.S. Pat. No. 5,350,994, which issued to Kinoshita et al. on Sep. 27, 1994; and U.S. Pat. No. 5,368,116, which issued to Iijima et al. on Nov. 29, 1994.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. P 44 32 483.9, filed on Sep. 13, 1994, having inventor Hans-Michael Meissner, and DE-OS P 44 32 483.9 and DE-PS P 44 32 483.9, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. Auxiliary propulsion system for seagoing ships, whereby a diesel engine, which is the main engine, drives a propeller by means of a shaft system, wherein a retrofittable diesel engine with a generator which operates an electric motor can be coupled by means of a transmission with a flexible coupling and a clutch to the shaft system to increase the power of the main engine.

2. Auxiliary propulsion system as claimed in claim 1, wherein the diesel engine, which is the main engine, and the electric motor and the retrofittable diesel engine with a generator, can be coupled to one another and adjusted by means of a control unit.

3. Auxiliary propulsion system as claimed in claim 1, wherein the electric motor can be operatively connected to a flywheel of the diesel engine by means of a clutch, and a transmission with a flexible coupling which can be coupled to the shaft system.

4. Auxiliary propulsion system as claimed in claim 2, wherein the electric motor can be operatively connected to a flywheel of the diesel engine by means of a clutch, and a transmission with a flexible coupling which can be coupled to the shaft system.

5. An auxiliary propulsion system for seagoing ships wherein the seagoing ship has a main diesel engine for driving a propeller by means of a shaft system, said auxiliary propulsion system comprising:

means for retrofitting in a ship;

means for increasing the propulsion power of the ship;

said means for increasing the propulsion power comprising:

an energy generation system;

said energy generation system comprising:

an additional diesel engine;

an electric generator;

said additional diesel engine being connected to supply energy to said generator;

an electric motor;

said generator being connected to supply electrical power to said electric motor;

connection means for operatively connecting said electric motor to the shaft system of the seagoing ship;

said connection means comprising:

a transmission; and a clutch;

said transmission being operatively connected to said electric motor; and said clutch comprising means for engaging and disengaging said transmission with said electric motor.

6. The auxiliary propulsion system according to claim 5, wherein:

said transmission comprises a flexible coupling; and said flexible coupling being disposed on the shaft system of the seagoing ship.

7. The auxiliary propulsion system according to claim 6, wherein:

said propulsion system further comprises a control unit;

said electric motor, the main diesel engine of the seagoing ship and said energy generation system being operatively connected to one another; and said control unit comprises means for monitoring and regulating said electric motor, said energy generation system and the main diesel engine of the seagoing ship.

8. The auxiliary propulsion system according to claim 7, wherein the main diesel engine of the seagoing ship comprises a flywheel;

said propulsion system comprises means for operatively connecting said electric motor to the flywheel; and said means for operatively connecting said electric motor comprises said transmission and said clutch.

9. The auxiliary propulsion system according to claim 6, wherein the main diesel engine of the seagoing ship comprises a flywheel;

said propulsion system comprises means for operatively connecting said electric motor to the flywheel; and said means for operatively connecting said electric motor comprises said transmission and said clutch.

10. A propulsion system for ships, said propulsion system comprising:

a main diesel engine;

a shaft system;

a propeller;

said main diesel engine comprising means for driving said propeller;

said means for driving said propeller comprising said shaft system being connected to said propeller;

auxiliary means for increasing the propulsion power of the ship;

said auxiliary means for increasing the propulsion power comprising:

an additional diesel engine;

an electric generator;

said additional diesel engine being connected to supply energy to said electric generator;

an electric motor;

said generator being connected to supply electrical power to said electric motor; and means for operatively connecting said auxiliary means with said shaft system so as to provide additional power for driving said propeller.

11. The propulsion system according to claim 10, wherein said auxiliary means for increasing the propulsion power is configured to be retrofittable.

12. The propulsion system according to claim 11, wherein said means for operatively connecting said auxiliary means comprises a transmission operatively connected to said electric motor.

13. The propulsion system according to claim 12, wherein said means for operatively connecting said auxiliary means further comprises a clutch; and said clutch comprises means for engaging and disengaging said transmission with said electric motor.

14. The propulsion system according to claim 13, wherein said means for operatively connecting said auxiliary means further comprises a flexible coupling disposed adjacent said transmission and said shaft system.

15. The propulsion system according to claim 14, wherein:

said main diesel engine comprises a flywheel;

said propulsion system comprises means for operatively connecting said electric motor to said flywheel; and said means for operatively connecting said electric motor to said flywheel comprises said transmission, said clutch and said flexible coupling.

16. The propulsion system according to claim 15, wherein said propulsion system further comprises a control unit; and said control unit comprises means for monitoring and regulating said propulsion system.

17. The propulsion system according to claim 16, wherein said means for monitoring and regulating said propulsion system comprises:

a computer; and connection means for operatively connecting said control unit to said propulsion system;

said connection means comprises control lines between at least said electric motor, said main diesel engine and said additional diesel engine; and said means for monitoring and regulating comprises means for controlling the driving of said electric motor relative to the driving of said main diesel engine.

18. The propulsion system according to claim 17, wherein said means for monitoring and regulating comprises feedback means; and said feedback means being configured for monitoring at least one of the operating characteristics of at least one of said main diesel engine and said electric motor and for utilizing said at least one monitored characteristic as at least one parameter for the regulation of said propulsion system.

19. The propulsion system according to claim 18, wherein said transmission comprises said flexible coupling;

said clutch being disposed between said transmission and said electric motor;

said transmission has a part associated with said electric motor and said clutch; and said flexible coupling being configured to one of: reduce and eliminate adverse effects on the transmission part due to oscillation of said shaft means.

20. The propulsion system according to claim 19, wherein:

said auxiliary means for increasing the propulsion power of the ship is configured for allowing at least a part of said auxiliary means to be disposed a substantial distance from said main diesel engine; and said additional diesel engine being substantially smaller than said main diesel engine.

* * * * *